UNITED STATES PATENT OFFICE.

WILLIAM GREEN STEVENS, OF MEMPHIS, TENNESSEE, ASSIGNOR OF ONE-HALF TO SIDNEY MILTON NEELY AND J. WALTER MAY, OF MEMPHIS, TENNESSEE.

ALLOY.

SPECIFICATION forming part of Letters Patent No. 726,588, dated April 28, 1903.

Application filed February 17, 1903. Serial No. 143,817. (No specimens.)

*To all whom it may concern:*

Be it known that I, WILLIAM GREEN STEVENS, a citizen of the United States, residing at Memphis, in the county of Shelby and State of Tennessee, have invented a new and useful Alloy, of which the following is a specification.

This invention relates to certain improvements in metallic alloys; and it has for its principal object to provide a novel alloy for use in the manufacture of woodworking and other tools and implements with a view of forming a thoroughly-tempered cutting-tool without the necessity of a forging process and without necessitating any reheating as a step in the tempering operation, such as is usually employed in tempering tools of steel.

A further and important feature of the invention is to form a cutting-tool in which copper is employed as the principal element, the remaining ingredients being introduced for the purpose of hardening and tempering copper and permitting the manufacture of various tools which will retain a cutting edge for a longer time than similar tools of steel or other metals.

In carrying out the invention I form an alloy by thoroughly mixing in molten condition the following ingredients, to wit: copper, seventy-five per cent.; tin, twenty per cent.; borax, 2.5 per cent.; lampblack, 2.5 per cent. These ingredients are to be thoroughly mingled in the proportions stated by agitating or mixing, the copper being melted first, and in a melted condition the other ingredients are added and thoroughly mixed or agitated. When thoroughly mixed, the molten alloy is fed into a suitable mold to form a tool or tools of the required shape and size.

The alloy can be remelted without losing any of its hardness, elasticity, or temper and when once acquired never loses any of these qualities. The mingling of the ingredients in proportions mentioned has the effect of making an alloy very hard and elastic and thoroughly tempered throughout, and it is susceptible of being forged without losing these qualities. The added ingredients when properly mixed with the copper give to the latter manifold advantages in the manufacture of woodworking tools and implements, the tools being thoroughly tempered and hardened throughout with ample elasticity, and such tools when worn can be remelted and again molded as often as required without losing temper or elasticity, so that all waste is avoided.

The alloy is commercially cheap, as tools and implements will be manufactured by a process of molding, being made and tempered by one and the same heat without the necessity of a forging or subsequent tempering process. The alloy can be forged with as good results as steel and yet retain all of these desirable qualities. A perfect edge is quickly and easily acquired and lasts for a much longer time than any woodworking-tools of other metals, and in sharpening it does not take a wire-edge. It is not susceptible to rust and can be used with thorough satisfaction in working any kind of seasoned wood.

Having thus described the invention, what is claimed is—

1. An alloy formed by fusing copper, and mixing therewith tin, borax and carbon in about the proportions specified.

2. An alloy formed by fusing and thoroughly mingling the following ingredients, to wit: copper, seventy-five per cent.; tin twenty per cent.; borax 2.5 per cent. and lampblack 2.5 per cent.

In testimony that I claim the foregoing as my own I have hereto affixed my signature in the presence of two witnesses.

WM. GREEN STEVENS.

Witnesses:
WM. H. FITZ HUGH,
C. D. MOORE.